United States Patent
Aoki et al.

(10) Patent No.: US 9,373,047 B2
(45) Date of Patent: Jun. 21, 2016

(54) BIOMETRIC AUTHENTICATION DEVICE, BIOMETRIC AUTHENTICATION SYSTEM, AND BIOMETRIC AUTHENTICATION METHOD

(75) Inventors: Takahiro Aoki, Kawasaki (JP); Soichi Hama, Kawasaki (JP); Mitsuaki Fukuda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 54 days.

(21) Appl. No.: 13/416,379

(22) Filed: Mar. 9, 2012

(65) Prior Publication Data

US 2012/0169464 A1    Jul. 5, 2012

Related U.S. Application Data

(63) Continuation of application No. PCT/JP2009/065905, filed on Sep. 11, 2009.

(51) Int. Cl.
*G05B 19/00* (2006.01)
*G06K 9/00* (2006.01)

(52) U.S. Cl.
CPC ........ *G06K 9/00926* (2013.01); *G06K 9/00355* (2013.01); *G06K 2009/00932* (2013.01)

(58) Field of Classification Search
CPC ............... G06F 21/32; G06K 9/00926; G06K 9/00355; G06K 2009/00932
USPC ................................. 340/5.82, 5.83
See application file for complete search history.

(56) References Cited

U.S. PATENT DOCUMENTS

| | | | | |
|---|---|---|---|---|
| 4,880,992 | A * | 11/1989 | Niedermayr | B25J 9/1692 250/231.14 |
| 6,125,192 | A * | 9/2000 | Bjorn | G06F 21/32 340/5.83 |
| 6,743,022 | B1 * | 6/2004 | Sarel | A61B 5/16 340/5.81 |
| 2003/0068073 | A1 * | 4/2003 | Wirtz | G06K 9/0002 382/124 |
| 2004/0086157 | A1 * | 5/2004 | Sukegawa | G06K 9/6255 382/115 |

(Continued)

FOREIGN PATENT DOCUMENTS

| | | |
|---|---|---|
| CN | 101364264 | 2/2009 |
| CN | 101419730 | 4/2009 |

(Continued)

OTHER PUBLICATIONS

International Search Report for PCT/JP2009/065905 mailed Oct. 13, 2009.

(Continued)

*Primary Examiner* — Hai Phan
*Assistant Examiner* — Zhen Y Wu
(74) *Attorney, Agent, or Firm* — Staas & Halsey LLP

(57) ABSTRACT

A biometric authentication device includes a photographing unit configured to photograph a biological body and acquire biological body information; an authentication unit configured to match registered biological body information that is registered in advance with the biological body information and perform authentication; a posture determination unit configured to determine steadiness of a posture of the biological body based on history of posture information relevant to the posture of the biological body when photographed; and an update determination unit configured to determine to update the registered biological body information when the posture determination unit determines that the posture of the biological body is steady.

7 Claims, 15 Drawing Sheets

(56) References Cited

U.S. PATENT DOCUMENTS

| | | | |
|---|---|---|---|
| 2005/0047632 A1 | 3/2005 | Miura et al. | |
| 2005/0286744 A1* | 12/2005 | Yoshizu | G06K 9/00 382/115 |
| 2006/0115129 A1 | 6/2006 | Abe | |
| 2006/0135224 A1* | 6/2006 | Patino | H04M 1/22 455/575.3 |
| 2007/0031010 A1* | 2/2007 | Sukegawa | G06K 9/6255 382/118 |
| 2007/0088714 A1* | 4/2007 | Edwards | G06F 3/013 |
| 2008/0240516 A1* | 10/2008 | Hayaishi | G06K 9/00228 382/118 |
| 2009/0232361 A1* | 9/2009 | Miller | G06K 9/6293 382/115 |

FOREIGN PATENT DOCUMENTS

| | | | |
|---|---|---|---|
| EP | 1 385 116 A1 | 1/2004 | |
| EP | 1 612 717 A2 | 1/2006 | |
| JP | 2005-84815 | 3/2005 | |
| JP | 2005-84815 A * | 3/2005 | G06T 7/00 |
| JP | 2006-26427 | 2/2006 | |
| JP | 2006-99374 | 4/2006 | |
| JP | 2006-198102 | 8/2006 | |
| JP | 2007-148724 | 6/2007 | |
| JP | 2008-79680 | 4/2008 | |
| JP | 2008-102770 | 5/2008 | |

OTHER PUBLICATIONS

Espacenet English Abstract of Chinese Application No. 101419730 published Apr. 29, 2009.

Chinese Patent Office Action issued in Chinese Patent Application No. 2009801613683 dated Nov. 1, 2013.

Espacenet English Abstract of European Publication No. 1 385 116 A1, Published Jan. 28, 2004.

Extended European Search Report dated Jun. 1, 2015 in corresponding European Patent Application No. 09849220.0.

Matsuo et al., "Arm Swing Identification Method with Template Update for Long Term Stability", Advances in Biometrics, Aug. 27, 2007, pp. 211-221.

Poh et al., "Challenges and Research Directions for Adaptive Biometric Recognition Systems", Advances in Biometrics, Jun. 2, 2009, pp. 753-764.

Espacenet English Abstract of Chinese Publication No. 101364264, Published Feb. 11, 2009.

Chinese Office Action dated Dec. 28, 2015 in corresponding Chinese Patent Application No. 200980161368.3.

Chinese Office Action dated Sep. 8, 2015 in corresponding Chinese Patent Application No. 200980161368.3.

Chinese Office Action dated May 3, 2016 in Application No. 200980161368.3.

* cited by examiner

FIG.4
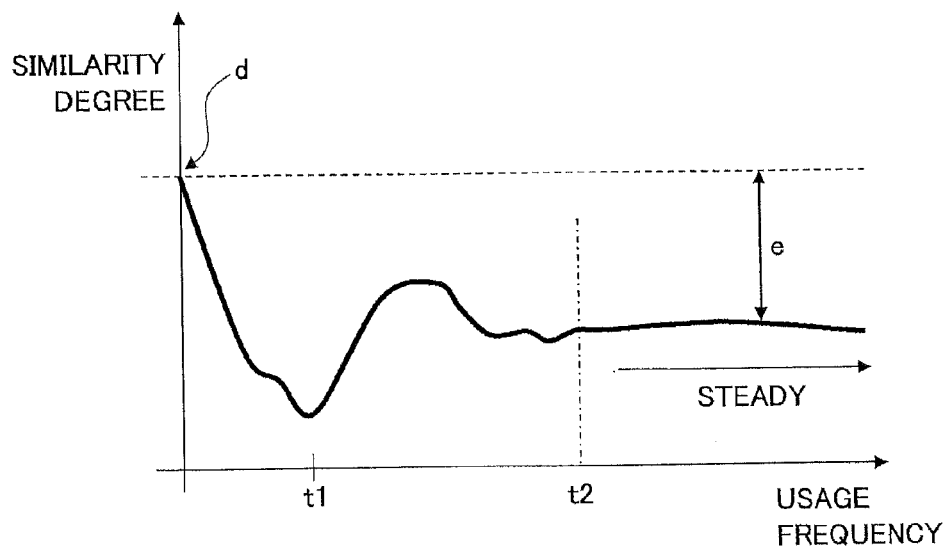
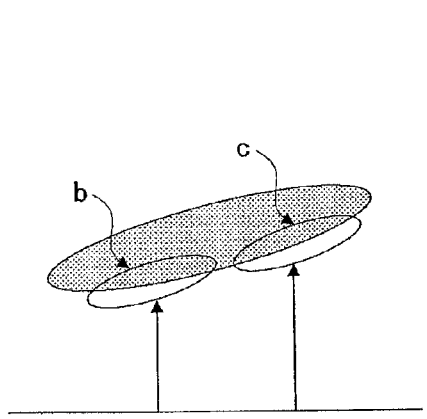
FIG.3 (A)
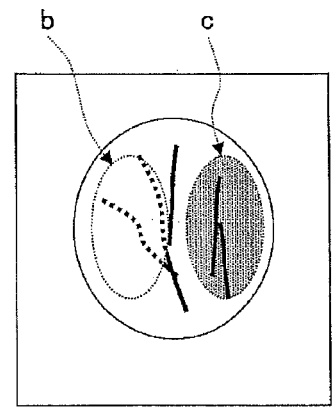
FIG.3 (B)

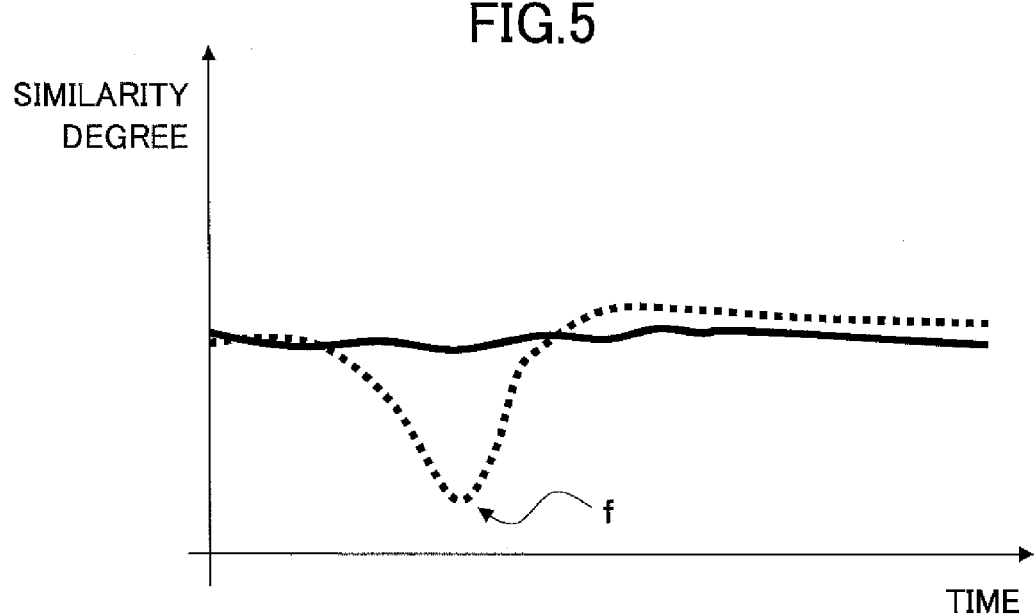

FIG.10

| No | DATE | POSTURE INFORMATION |
|---|---|---|
| 1 | ○○YEAR○○MONTH○○DAY XX:XX:XX | $D(1) = (\Delta x1, \Delta d1, \Delta \theta 1, \Delta \Omega 1)$ |
| 2 | ○○YEAR○○MONTH○○DAY XX:XX:XX | $D(2) = (\Delta x2, \Delta d2, \Delta \theta 2, \Delta \Omega 2)$ |
| 3 | ○○YEAR○○MONTH○○DAY XX:XX:XX | $D(3) = (\Delta x3, \Delta d3, \Delta \theta 3, \Delta \Omega 3)$ |
| 4 | ○○YEAR○○MONTH○○DAY XX:XX:XX | $D(4) = (\Delta x4, \Delta d4, \Delta \theta 4, \Delta \Omega 4)$ |

| No | DATE OF UPDATING REGISTERED BIOLOGICAL BODY INFORMATION |
|---|---|
| 1 | ○○YEAR○○MONTH○○DAY XX:XX:XX |
| 2 | ○○YEAR○○MONTH○○DAY XX:XX:XX |

FIG.15

REGISTRATION IS COMPLETED.

[ATTENTION]
PLEASE NOTE THAT YOU MAY BE REQUESTED TO
PERFORM REREGISTRATION APPROXIMATELY
ONE MONTH LATER.

BIOMETRIC AUTHENTICATION DEVICE, BIOMETRIC AUTHENTICATION SYSTEM, AND BIOMETRIC AUTHENTICATION METHOD

CROSS-REFERENCE TO RELATED APPLICATION

This patent application is based upon and claims the benefit of priority under 35 USC 120 and 365(c) of PCT application JP2009/065905 filed in Japan on Sep. 11, 2009, the entire contents of which are incorporated herein by reference.

FIELD

The present invention is related to a biometric authentication device, a biometric authentication system, and a biometric authentication method.

BACKGROUND

Biometric authentication is a technology for identifying individuals based on biological features (palm veins, face, etc.) of human beings. In biometric authentication, first, feature data of the biological body of a person is registered as "registered biological body information". At the time of authentication, feature data acquired with a sensor (such as a camera) is compared with the registered biological body information, the "similarity degree (degree of similarity)" expressing how much these data items are similar is calculated, and it is determined that the person being authenticated is the registered person if the similarity degree exceeds a predetermined threshold.

The feature data for biometric authentication is unlikely to be input based on exactly the same posture as that when the feature data had been registered. The posture refers to the positional relationship between a biological body (palm veins, face, etc.) and the sensor. Specifically, the posture is expressed by parameters such as a distance, a tilt angle, and a rotational angle.

A matching process is typically performed by allowing a predetermined variation in the posture. For example, image conversion such as parallel shift and rotation is performed on the input feature data, while comparing the feature data undergoing the image conversion with the registered biological body information, to search for the maximum similarity degree. In many cases, when the similarity degree exceeds a predetermined threshold, the matching process is ended. Accordingly, when there is a large variation between the posture at the time of registration and the posture at the time of authentication, excessive time is taken for the matching process because image conversion is performed. Furthermore, if the variation in the posture exceeds a predetermined range, it may not be possible to correct the feature data by image conversion, which deteriorates the precision in the authentication.

Accordingly, there is a disclosed technology for accumulating authentication results, determining whether the registered biological body information is to be registered again (reregistered) based on the frequency of unsuccessful authentication attempts, and prompting a user for which authentication has been frequently unsuccessful to reregister the registered biological body information. Furthermore, when the matching degree of the matching result is greater than or equal to an authentication determination threshold (90%) and less than or equal to a reregistration determination threshold (93%), it is determined that reregistration is to be performed, and the user is prompted to reregister the registered biological body information.

Furthermore, a technology has been developed for increasing the authentication precision by determining the posture at the time of authentication. For example, the following technology for increasing the precision of authenticating an individual is disclosed. In addition to performing biometric authentication with the master data used for authentication, a function/means for detecting differences in the posture may be provided. Accordingly, the posture may be corrected at the time of authentication.

Patent Document 1: Japanese Laid-Open Patent Publication No. 2006-99374
Patent Document 2: Japanese Laid-Open Patent Publication No. 2008-102770
Patent Document 3: Japanese Laid-Open Patent Publication No. 2007-148724

As described above, in biometric authentication, it is determined whether a person being subjected to biometric authentication is the registered person by using registered biological body information as a reference. Therefore, the quality of the registered biological body information is significantly important. If the registered biological body information is inappropriate, the feature data may not be corrected even by applying various adjustments in the authentication process, and therefore an authentication error occurs.

Particularly, in the case of biometric authentication using images, the "posture" of the biological body with respect to the sensor has a large impact on the authentication precision. For example, in the case of "palm vein authentication", (1) the position, (2) the distance, (3) the tilt angle, and (4) the rotational angle of the palm with respect to the sensor correspond to the posture (see FIG. 1).

FIG. 1 is for describing the position, the distance, the tilt angle, and the rotational angle of the palm with respect to the sensor in palm vein authentication. As illustrated in FIG. 1, the position, the distance, the tilt angle, and the rotational angle may be considered as parameters for expressing the "posture" of the palm. The following describes a case where images (biological body images) acquired by the sensor differ according to the posture, even though the vein patterns on the palm are the same.

FIG. 2(A) illustrates an example of a biological body in a normal position. FIG. 2(B) illustrates an example of a biological body in an abnormal position.

When a biological body image is acquired by a sensor, the biological body is photographed with the lighting on. The biological body image is affected by the distribution of the intensity of the lighting. The impact of the intensity distribution of the lighting is attributed to the fact that the intensity of the lighting is uneven within the field of view. Furthermore, in an optical system using lenses, limb darkening occurs, in which the apparent brightness decreases toward the periphery of the lens. The part denoted by "a" in FIG. 2(B) is near the periphery of the lens, and therefore the brightness is slightly lower. Thus, according to the position in the image, the apparent brightness changes (for example, see "a" in FIG. 2(B)), which has an adverse effect on the authentication process.

FIG. 3(A) is for describing the tilt angle of the palm with respect to the sensor. As illustrated in FIG. 3(A), when the palm is tilted, there is formed an area b that is close to the sensor and an area c that is away from the sensor. FIG. 3(B) illustrates an example of a biological body image obtained by photographing the palm in the posture illustrated in FIG. 3(A). Typically, in a photographed image, areas close to the sensor are bright and areas away from the sensor are dark.

Therefore, in the example of FIG. 3(B), the area b appears to be bright and the area c appears to be dark in the biological body image. Accordingly, it is difficult to extract features in areas away from the sensor. Furthermore, it is difficult to extract features when the sensor is too close and overexposure is caused.

Furthermore, the photographed image is affected by lens distortion. Generally, the periphery of a lens is affected more by lens distortion than the center of the lens. Therefore, the posture of a subject largely affects the photographed image. As described above, the posture of a subject largely affects the similarity degree between the biological body information obtained by photographing the biological body and the registered biological body information.

In the conventional technology, in a case where the user is prompted to perform reregistration (to update the registered biological body information) when the similarity degree decreases, the following problem remains. That is, if the decrease in the similarity degree is attributed to unsteady postures of the subject, even if the information is updated, the precision in the similarity degree may not improve because the postures are still likely to be unsteady.

Furthermore, in the conventional technology, in a case where the posture at the time of registration is stored and the user is asked to correct his posture to the registered posture every time the authentication is performed, it may be inconvenient for the user.

SUMMARY

A disclosed biometric authentication device includes a photographing unit configured to photograph a biological body and acquire biological body information; an authentication unit configured to match registered biological body information that is registered in advance with said biological body information and perform authentication; a posture determination unit configured to determine steadiness of a posture of said biological body based on history of posture information relevant to the posture of said biological body when photographed; and an update determination unit configured to determine to update said registered biological body information when said posture determination unit determines that the posture of said biological body is steady.

The subject and advantages of the invention will be realized and attained by means of the elements and combinations particularly pointed out in the appended claims. It is to be understood that both the foregoing general description and the following detailed description are exemplary and explanatory and are not restrictive of the invention as claimed.

BRIEF DESCRIPTION OF DRAWINGS

FIG. 3(A) is for describing the tilt angle of a palm with respect to the sensor.

FIG. 3(B) indicates an example of a photographed biological body image in the posture of FIG. 3(A).

FIG. 4 is an image diagram of experiment results.

FIG. 5 illustrates the decrease in similarity degree due to changes in the biological body.

FIG. 10 illustrates an example of history information of the posture variation amount.

FIG. 15 indicates an example of an update notification screen.

DESCRIPTION OF EMBODIMENTS

Figure 1:
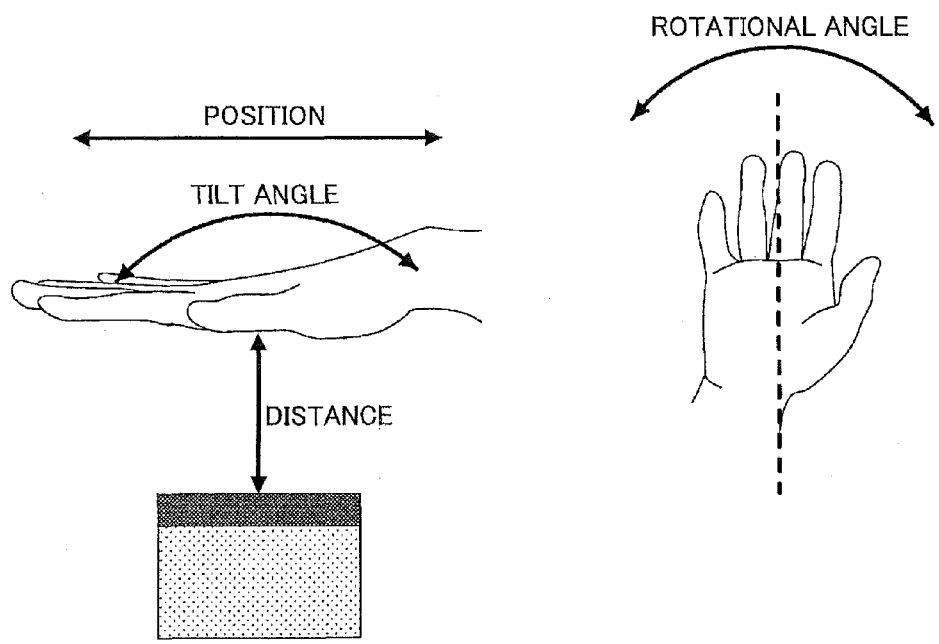
FIG. 1 is for describing the position, the distance, the tilt angle, and the rotational angle of a palm with respect to a sensor in palm vein authentication.
Figure 2:
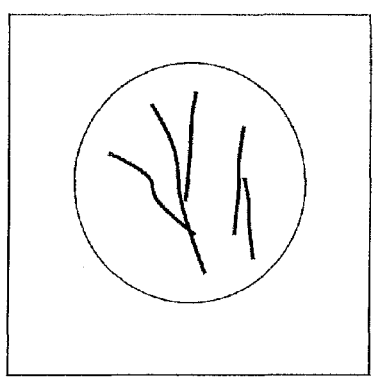
FIG. 2(A) illustrates an example of a biological body in a normal position.
FIG. 2(B) illustrates an example of a biological body in an abnormal position.
Figure 2:
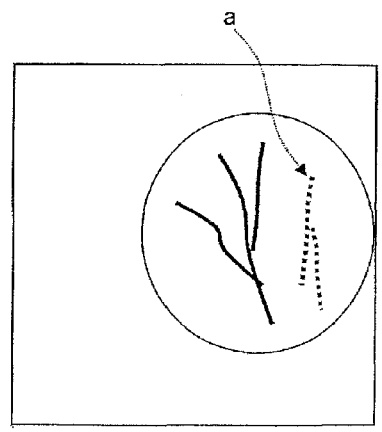

A description is given of embodiments of the present invention with reference to drawings.

[First Embodiment]

First, a description is given of an experiment conducted by the inventors for examining the relationship between the similarity degree and variations in the posture. The inventors verified the history data of the similarity degree and conducted the following experiment for examining variations in the posture. The examination conditions were as follows.

Photograph palm veins with a biometric authentication sensor and measure the similarity degree over time.

Measure the similarity degree three times a day at morning, noon, and night (two days off per week).

Nine test subjects.

FIG. 4 is an image diagram of the experiment results. As illustrated in FIG. 4, there is a difference "e" between the similarity degree at the time of registration and the similarity degree when the similarity degree has become stable. In the case of a beginner who is not used to the device, the posture of the biological body at the time of registration d is inappropriate. However, as the number of times the user uses the device increases, the posture of the biological body at the time of authentication becomes steady. This is considered to be the factor of the difference "e". Furthermore, as illustrated in FIG. 4, the similarity degree decreases immediately after starting to use the device. This decrease is considered to be caused as follows. Immediately after starting to use the device, the posture varies largely, and therefore the posture of the biological body at the time of registration and the posture of the biological body immediately after starting to use the device at the time of authentication are different.

In the conventional technology, in a case where the user is prompted to perform reregistration (to update the registered biological body information) when the similarity degree decreases, the user is highly likely to be prompted to perform reregistration at the time point near "t1" in FIG. 4 where the similarity degree is lowest. However, at "t1", the posture of the biological body at the time of authentication has not yet become steady, and therefore the authentication precision is unlikely to improve beyond t1.

Furthermore, in the authentication process, when the biological body itself changes, the similarity degree decreases. For example, in the case of vein authentication, when a small scar is created on the palm, the condition of veins may change due to clotted blood. Consequently, the similarity degree may decrease.

FIG. 5 illustrates the decrease in the similarity degree due to changes in the biological body. In FIG. 5, "f" denotes a decrease in the similarity degree caused by a small scar during vein authentication. In the conventional technology, when it is determined whether to perform reregistration by using the similarity degree as a reference, the user is prompted to perform reregistration at a time point near "f" indicated in FIG. 5. However, the biological body recovers its original condition when the small scar is cured, and therefore it is inappropriate to perform the reregistration at "f" indicated in FIG. 5. Based on the above experiment results and analysis results, a biometric authentication device according to the first embodiment is described as follows.

<Functional Configuration>

Figure 6:
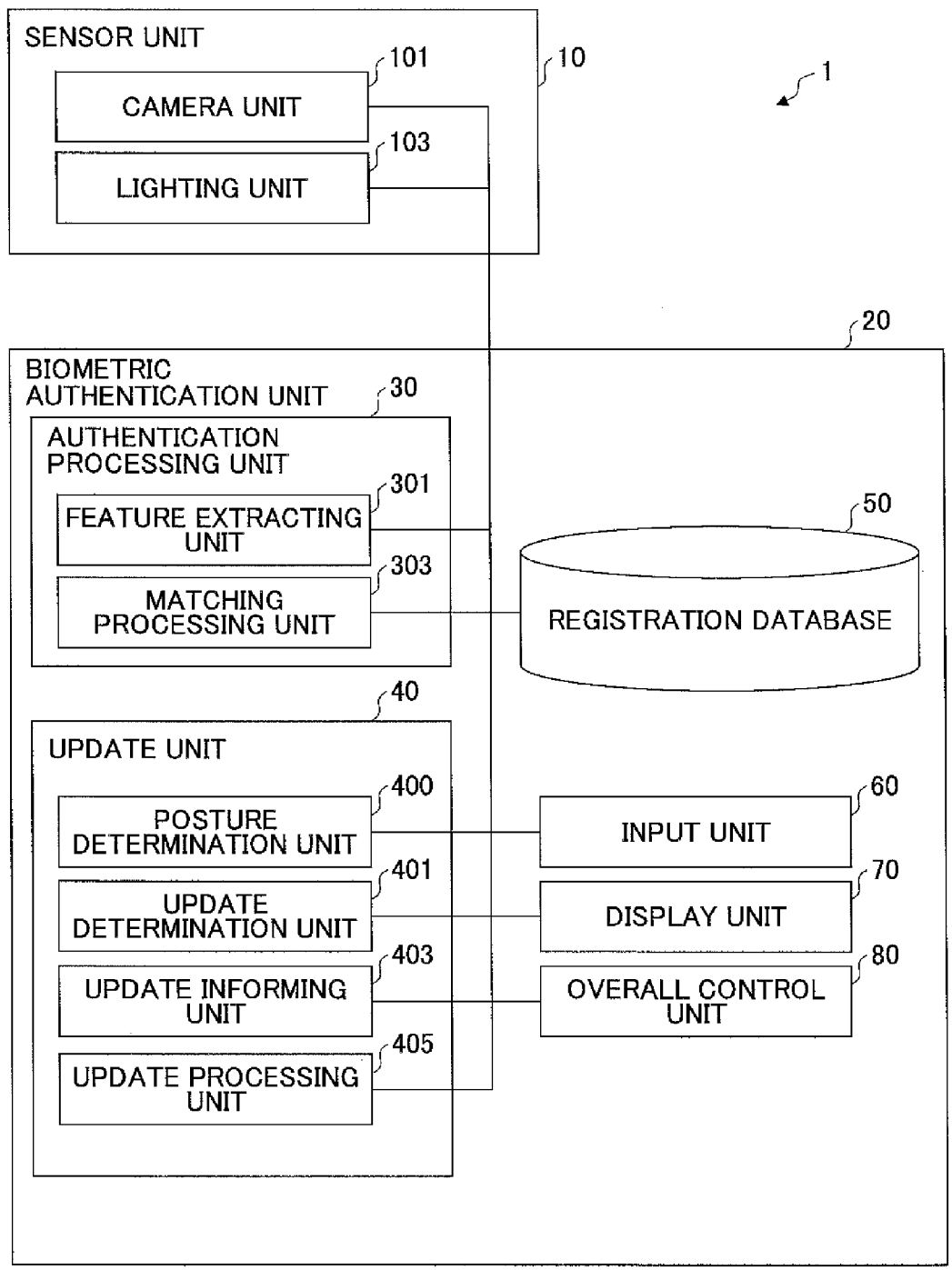
FIG. 6 is a block diagram indicating an example of the functional configuration of a biometric authentication device 1 according to a first embodiment.

FIG. 6 is a block diagram indicating an example of the functional configuration of a biometric authentication device 1 according to the first embodiment. As indicated in FIG. 6, the biometric authentication device 1 includes a sensor unit 10 for providing a sensor function to acquire feature data (biological body information) used for biometric authentication, and a biometric authentication unit 20 for performing biometric authentication with the use of registered biological body information and input biological body information. The registered biological body information is biological body information serving as a basis for the authentication, which is registered in a registration database 50.

First, a description is given of the sensor unit 10. The sensor unit 10 includes a camera unit 101 and a lighting unit 103.

The camera unit 101 photographs a biological body for registration and authentication, and outputs the photographed images to the biometric authentication unit 20. The camera unit 101 includes a CMOS (Complementary Metal-Oxide Semiconductor) or a CCD (Charge Coupled Device). The biological body may be, for example, palm veins, a finger pattern, or an iris. In the following, the biological body is described as palm veins, but the present invention is not so limited.

The lighting unit 103 radiates light to the biological body when performing registration and authentication. The lighting unit 103 is to be turned on when the camera unit 101 is photographing the biological body. The lighting unit 103 includes a LED (Light Emitting Diode). In palm vein authentication, the veins under the skin are photographed, and therefore the lighting unit 103 radiates near-infrared light.

Next, a description is given of the biometric authentication unit 20. The biometric authentication unit 20 includes an authentication processing unit 30, an update unit 40, the registration database 50, an input unit 60, a display unit 70, and an overall control unit 80.

The authentication processing unit 30 compares the biological body photographed at the time of registration with the biological body photographed at the time of authentication, and performs a process of determining whether the person being authenticated is the registered person. Specifically, the authentication processing unit 30 has the following two functions.

A feature extracting unit 301 extracts features used for authentication from the image obtained by photographing the biological body. In the example of palm vein authentication, only the vein pattern (biological body information) is extracted from the image obtained by photographing the palm.

A matching processing unit 303 performs a comparison process (matching process) of comparing the biological body information acquired at the time of registration with the biological body information acquired at the time of authentication, and calculates the similarity degree expressing how much these information items match. Furthermore, the matching processing unit 303 registers the calculated similarity degree in the registration database 50. The similarity degree is registered in the registration database 50 as history information. The biological body information acquired at the time of registration is stored in the registration database 50 as registered biological body information.

Next, the update unit 40 determines whether to update the registered biological body information based on the history information of the similarity degree registered in the registration database 50. When it is determined to update the registered biological body information, the update unit 40 prompts the user to perform an update process. Specifically, the update unit 40 includes the following functions.

A posture determination unit 400 determines whether the posture has become steady at the time of authentication based on the history information of the similarity degree registered in the registration database 50. Specifically, the posture determination unit 400 accumulates the differences between the newest similarity degree and a predetermined number of latest similarity degrees. When the accumulated value is less than or equal to a predetermined value, the posture determination unit 400 determines that the posture has become steady. Furthermore, when the accumulated value is greater than the predetermined value, the posture determination unit 400 determines that the posture is not steady. This determination is based on the idea that the steadiness of the similarity degree is considered as the steadiness of the posture. The posture determination unit 400 outputs the determination result to an update determination unit 401.

The update determination unit 401 determines to update the registered biological body information when the determination result acquired from the posture determination unit 400 indicates steady, and determines not to update the registered biological body information when the determination result indicates unsteady. Furthermore, when it is determined to update the registered biological body information, the update determination unit 401 instructs an update informing unit 403 to report an update message.

In addition to the steadiness condition of the similarity degree, the update determination unit 401 may determine not to update the registered biological body information when the similarity degree that has become steady and the initial similarity degree are substantially the same. Specifically, the update determination unit 401 determines the difference between the steady similarity degree and the initial similarity degree, and determines not to update the registered biological body information when the difference is less than or equal to a predetermined value. Furthermore, when the difference is greater than the predetermined value, the update determination unit 401 determines to update the registered biological body information.

When the report is received from the update determination unit 401, the update informing unit 403 reports, to the user and the system administrator, a message prompting to update (reregister) the registered biological body information. For example, the update informing unit 403 displays the message on the display unit 70 for the user and reports the message to the system administrator by e-mail. The update informing unit 403 stores the e-mail address of the administrator in advance.

When the system administrator is to be present at the time of updating the registered biological body information, the update informing unit 403 may display the time and place that updating is possible in the message to the user. In this case, for example, the registration database 50 stores the time and place that the system administrator is able to be present.

For example, an update processing unit 405 updates the registered biological body information when the system administrator inputs information to be used for updating the registered biological body information. The update processing unit 405 overwrites the registered biological body information registered in the registration database 50 with the biological body information extracted by the feature extracting unit 301, when updating is allowed.

Furthermore, the update processing unit 405 may detect the similarity degree at the time of updating, determine whether the similarity degree at the time of updating is the same as the similarity degree when the posture is steady, and allow the updating only when the similarity degree at the time of updating is substantially the same as the similarity degree when the posture is steady. Specifically, the update processing unit 405 obtains the difference between the similarity degree at the time of updating and the similarity degree when the posture is steady, and allows the updating when the obtained difference is less than or equal to a predetermined threshold.

The registration database 50 saves various information items to be used by the biometric authentication device 1. For example, the registration database 50 holds the registered biological body information used for performing biometric authentication on users. Furthermore, the registration database 50 manages history information of the similarity degree for each user.

The input unit 60 is used by the user to input an ID for identifying himself. Specific means for inputting an ID are a numerical keypad, a non-contact IC card, a keyboard, and a touch panel.

The display unit 70 reports an updating message to the user by displaying the message or by outputting a sound. Specifically, the display unit 70 includes a display device such as a CRT (Cathode Ray Tube) or an LCD (Liquid Crystal Display), and a speaker for outputting sounds.

The overall control unit 80 calls the respective appropriate units and executes a biometric authentication process and an update process. For example, the overall control unit 80 is a CPU.

Thus, according to the first embodiment, steadiness of the similarity degree is considered as the steadiness of the posture, the biological body information is extracted from the image obtained by photographing the biological body at the time when the posture is steady, and the extracted biological body information is used as the registered biological body information.

[Second Embodiment]

Next, a description is given of a biometric authentication device 2 according to a second embodiment. In the second embodiment, the posture information of the biological body at the time of authentication is detected, and the steadiness of the posture of the biological body is determined.

<Functional Configuration>

Figure 7:
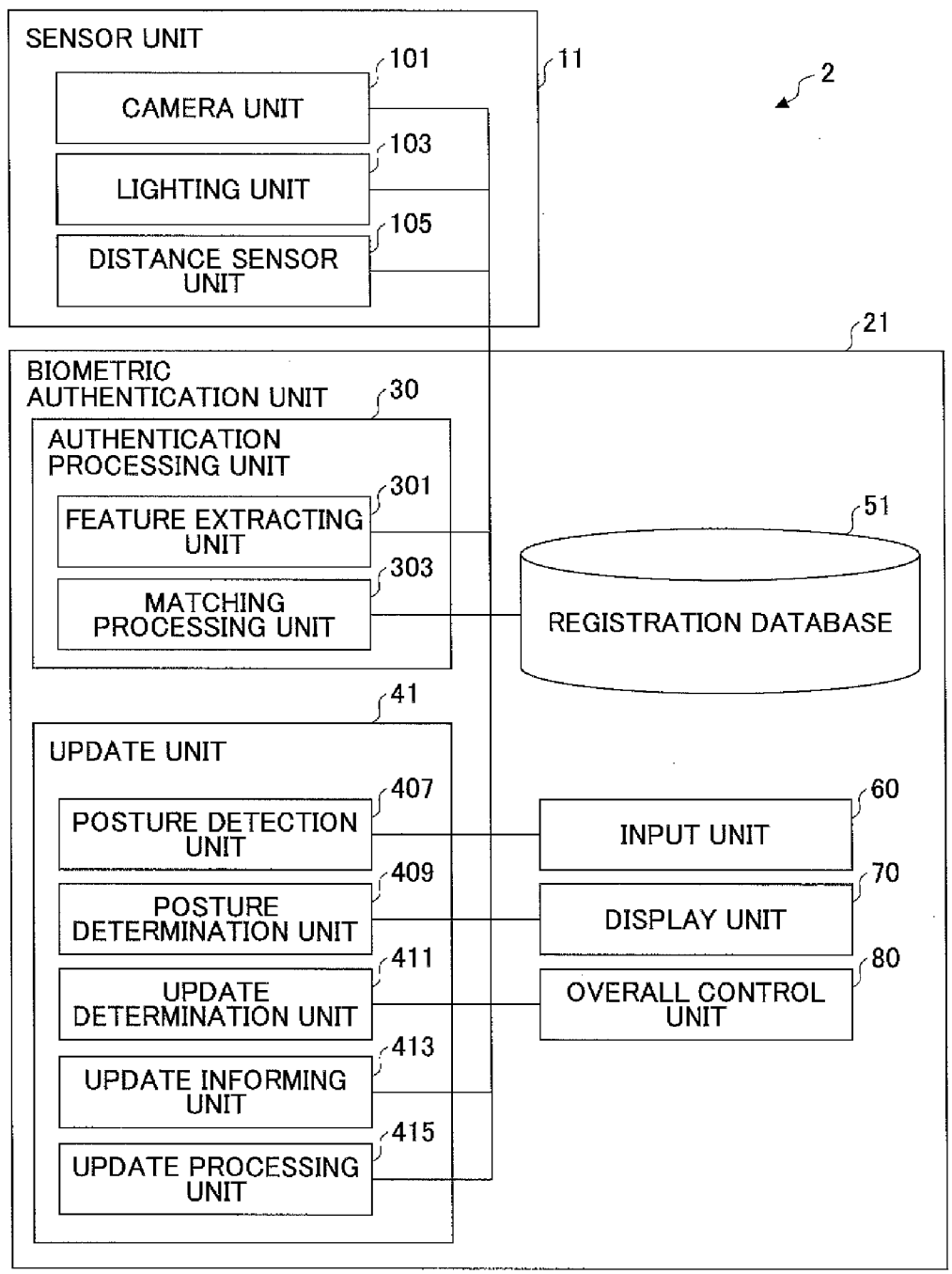
FIG. 7 is a block diagram indicating an example of the functional configuration of a biometric authentication device 2 according to a second embodiment.

FIG. 7 is a block diagram indicating an example of the functional configuration of the biometric authentication device 2 according to the second embodiment. As illustrated in FIG. 7, the biometric authentication device 2 includes a sensor unit 11 and a biometric authentication unit 21. Functions indicated in FIG. 7 corresponding to those in FIG. 6 are denoted by the same reference numerals and are not further described.

First, the sensor unit 11 is described. The sensor unit 11 includes the camera unit 101, the lighting unit 103, and a distance sensor unit 105. The following describes the distance sensor unit 105.

The distance sensor unit 105 measures the distance between the distance sensor unit 105 and the biological body at the time of registration and at the time of authentication. The distance sensor unit 105 includes plural distance sensors, and outputs the acquired distance information to the biometric authentication unit 21.

Next, the biometric authentication unit 21 is described. The biometric authentication unit 21 includes the authentication processing unit 30, an update unit 41, a registration database 51, the input unit 60, the display unit 70, and the overall control unit 80. The following primarily describes the update unit 41 and the registration database 51.

The update unit 41 determines whether to update the registered biological body information based on the posture of the biological body at the time when being photographed by the camera unit 101. When it is determined to be updated, the update unit 41 prompts the user to perform an update process. Specifically, the update unit 41 has the following functions.

A posture detection unit 407 performs a detection process of detecting parameters relevant to the posture (also referred to as posture information) from the image of the biological body input from the sensor unit 11 and the data of the distance sensor unit 105.

(1) Position

The position (x, y) of the palm is a value indicating the position of the palm. Furthermore, the position of the palm is defined as the geometric center of a palm area after cutting out the palm area. The difference ($\Delta x$, $\Delta y$) between the obtained geometric center (x, y) and the reference position (for example, the center position of the screen) (x0, y0) is set as the position parameter of the posture variation amount. The posture variation amount corresponds to the difference between posture information and a reference value. The posture variation amount may be regarded as posture information.

That is to say, (x, y) is an absolute value and ($\Delta x$, $\Delta y$) is a relative value. The position parameter ($\Delta x$, $\Delta y$) is (0, 0) when the palm is positioned at the center of the sensor (assumed to be the reference position). When the palm is displaced from the center, the position parameter expresses the positional shift. Furthermore, the geometric center (x, y) may be used as the position parameter. Furthermore, in the following, ($\Delta x$, $\Delta y$) is simply expressed as Ax.

(2) Distance

The distance d from the sensor unit 11 to the palm is measured with a distance sensor. When there are plural distance sensors, an average value is set as d. The distance parameter of the posture variation amount is the difference $\Delta d$ between the distance d and the reference distance. For example, assuming that the reference distance between the sensor unit 11 and the palm is 5 cm, and the distance d when the palm is actually photographed is 4 cm, the distance parameter is Δd=4-5=−1 (cm).

Furthermore, other than the method of using a distance sensor, there is a method of obtaining the distance with the use of brightness. This method uses the fact that the brightness of the subject decreases as the distance from the lighting increases. This method is realized by saving a table of association between the brightness and the distance in advance.

(3) Tilt angle

The following is a formula expressing a three-dimensional plane.

$$aX+bY+cZ+1=0 \quad \text{formula (1)}$$

There are three individual variables (X, Y, Z), and therefore the plane is expressed by determining three points on the plane. Thus, a configuration including three distance sensors is considered. It is assumed that Di is a value measured by the i th distance sensor (measurement value from distance sensor to palm). Furthermore, assuming that the coordinates of the distance sensor in an XY plane are (Xi, Yi), a point Pi (Xi, Yi, Di) is located on the palm.

Figure 8:
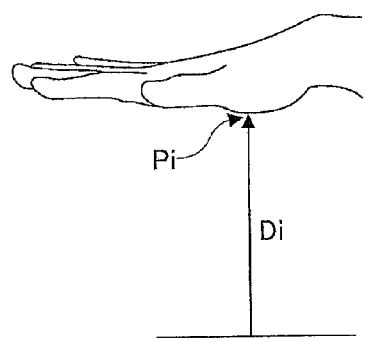
FIG. 8(A) illustrates a distance Di from a distance sensor to a palm.
FIG. 8(B) illustrates coordinates (Xi, Yi) of the distance sensor in an XY plane.
FIG. 8(C) illustrates an example of a tilt angle θ of the palm.
Figure 8:
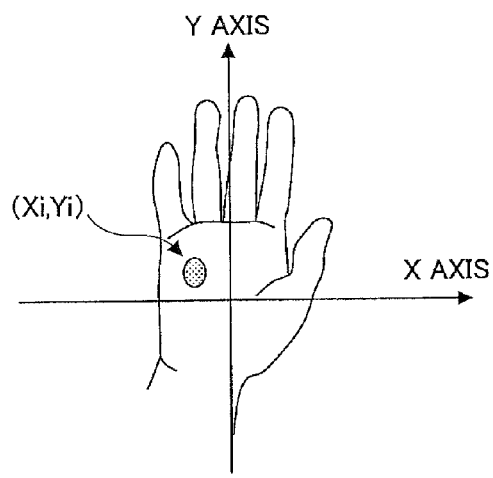
Figure 8:
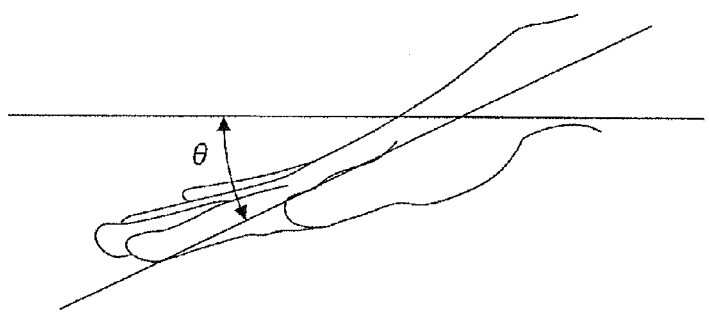

FIG. 8(A) illustrates the distance Di from the distance sensor to the palm. FIG. 8(B) illustrates the coordinates (Xi, Yi) of the distance sensor in the XY plane. As illustrated in FIG. 8, Pi is the intersection of a perpendicular line extending upward from the distance sensor and the palm.

By assigning the coordinates Pi (i=1, 2, 3) obtained from the three distance sensors to formula 1, and solving the simultaneous equation, the update determination unit 401 calculates parameters (a, b, c). The parameters (a, b, c) are for describing a plane obtained by approximating the palm, and therefore the posture detection unit 407 calculates the tilt angle θ by using these parameters.

The tilt angle θ is described with reference to FIG. 8(C). FIG. 8(C) illustrates an example of the tilt angle θ of the palm. The tilt angle θ illustrated in FIG. 8(C) corresponds to the tilt within the Y-Z plane (X=0), and is thus calculated from the tilt of a linear line formula bY+cZ=−1 by assigning X=0 to the plane formula 1. Specifically, the posture detection unit 407 calculates the tilt angle θ from tanθ=b/c.

When there are three or more distance sensors, the posture detection unit 407 may calculate parameters (a, b, c) with respect to all possible combinations, and use the average value of the calculated parameters to calculate the tilt angle θ. The tilt parameter in the posture variation amount is set to be the difference Δθ between the calculated θ and the reference plane (for example, the X=0 plane).

(4) Rotational Angle

The edge of the palm is used as a reference for calculating the rotational angle Ω of the palm. The reason why the edge of the palm is used is that the shape of the palm includes many linear lines in the vertical direction. The posture detection unit 407 calculates the average direction of the edge lines, and uses the average direction to calculate the rotational angle Ω of the palm.

Figure 9:
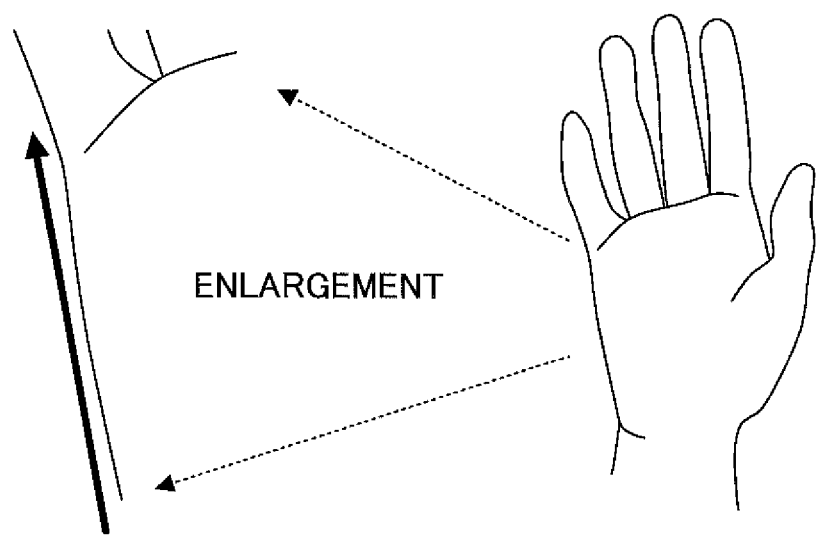
FIG. 9 indicates an edge of the palm.

FIG. 9 indicates an edge of the palm. The posture detection unit 407 first obtains an edge as indicated in FIG. 9. Next, the posture detection unit 407 uses the obtained edge to calculate the rotational angle Ω.

Specifically, the posture detection unit 407 calculates the rotational angle Ω by the following procedures. First, the posture detection unit 407 detects edges from the image of the palm by applying a quadratic differential (Laplacian filter). Next, the posture detection unit 407 uses Hough transformation to determine the direction from the detected edges.

Hough transformation is a conversion method for expressing a linear line that may pass a certain point Q (x, y) by using the following two parameters.

A distance r from the origin tilt angle θ

The posture detection unit 407 calculates (r, θ) for points P (x, y) on all of the detected edges, and plots them in the r-θ space. At this time, when the original image (image of edges of palm) includes many edges of a particular tilt angle, many points are plotted on this particular tilt angle θ. That is to say, the posture detection unit 407 calculates the θ on which many points are plotted (polled) in the space after Hough transformation to determine the rotational angle Ω of the palm. The rotation parameter in the posture variation amount is set to be the difference ΔΩ between the calculated rotational angle Ω and a reference line (for example, the Y axis).

Furthermore, the posture detection unit 407 stores the calculated posture variation amount (Δx, Δd, Δθ, ΔΩ) in the registration database 51 and also outputs this to a posture determination unit 409.

The posture detection unit 407 may not always obtain the posture variation amount. The posture information (x, d, θ, Ω) may be stored in the registration database 51. In the posture information, the position of the palm (x, y) is collectively expressed by x.

The posture determination unit 409 acquires the posture variation amount calculated by the posture detection unit 407, and determines whether the posture of the biological body is steady based on the history information of the posture variation amount stored in the registration database 51.

FIG. 10 illustrates an example of history information of the posture variation amount. As illustrated in FIG. 10, in the history information, the time when the posture variation amount had been acquired (for example, the time of authentication) and the posture variation amount are associated with each other.

The posture determination unit 409 calculates a posture variation amount E(t) by multiplying each of the elements in the posture variation amount by a normalization coefficient W=(w0, w1, w2, w3).

$$E(t)=w0\times\Delta x+w1\times\Delta d+w3\times\Delta\theta+w4\times\Delta\Omega \quad \text{formula (2)}$$

The normalization coefficient W is expressed as follows, using the upper limit of the posture amount allowed by the authentication engine.

$$W=((1/\Delta x\text{max}), (1/\Delta d\text{max}), (1/\Delta\theta\text{max}), (1/\Delta\Omega\text{max}))$$

In this formula, Δxmax expresses the maximum value of the position variation amount allowed by the authentication engine. For example, it is assumed that Δxmax is 2 (cm). Furthermore, Δdmax, Δθmax, and ΔΩmax are also the maximum values of the variation amount allowed by the authentication engine. For example, it is assumed that Δdmax is 1 (cm), ΔΩmax is 10 (degrees), and ΔΩmax is 20 (degrees). E(t) is a vector for expressing the variation amount by a ratio with respect to the maximum amount allowed.

Furthermore, other than the method using the normalization coefficient, a method of applying weight may be used. The reason why weight is applied to the posture variation amount is that the respective parameters of the posture variation amount have different levels of impact on the authentication. For example, the difference in the position (Δx, Δy) may be corrected merely by parallel shift, and thus has a small impact on the authentication. Accordingly, w0 is set to a small value.

Meanwhile, the tilt angle θ is to be subjected to affine transformation and projective transformation as image conversion, and thus has a large impact on the authentication. Accordingly, w2 is set to be a large value. As described above, the weights are experimentally set in advance in consideration of the levels of impact on the authentication. Incidentally, the authentication may not always be performed by using a normalization coefficient or weights.

Next, the posture determination unit 409 evaluates the steadiness of the posture based on the calculated posture variation amount E(t).

Specifically, the posture determination unit 409 calculates an accumulated value Esum(t) expressing distances between the posture variation amounts E(t) of the past N times and the vector.

$$E\text{sum}(t) = \alpha 0 \times |E(t) - E(t-1)| + = 1 \times |E(t) - E(t-2)| + \ldots + \alpha N - 1 > |E(t) - E(t-N)| \quad \text{formula (3)}$$

The values α0 and α1 appearing in the formula (3) express the weights of the history data. By setting the latest data weight (such as α0) to be a larger value than other weights, the reliability in the evaluation of steadiness is increased. Esum(t) expresses the accumulation of the posture variation amounts E(t) of the past N times from a time point t. The weights of the history data may not always be used.

Furthermore, when the following condition is satisfied, the posture determination unit 409 determines that the posture has become steady.

$$E\text{sum}(t) < Th1 \quad \text{(condition 1)}$$

Th1 is a threshold used for determining the steadiness of the posture. For example, Th1 is set to be 0.05 (5%). The posture determination unit 409 reports the results of determining the steadiness of the posture to an update determination unit 411.

When posture information is used instead of the posture variation amount, the posture determination unit 409 uses the value used as a reference of the posture variation amount as the present posture information. Next, the posture determination unit 409 calculates the difference between the present posture information and the past posture information, and uses this difference as the posture variation amount for performing the same process as that described above to calculate E(t) and Esum(t).

The update determination unit 411 calculates the difference Ereg(t) between the posture variation amount E(0) of the registered biological body information and the posture variation amount E(t) of the present biological body information.

$$E\text{reg}(t) = |E(0) - E(t)| \quad \text{formula (4)}$$

When the following condition is satisfied, the update determination unit 411 determines that the posture at the time of registration and the present posture are different.

$$E\text{reg}(t) > Th2 \quad \text{(condition 2)}$$

Th2 is a threshold used for determining how much the present posture has varied from the time of registration. For example, Th2 is set to be 0.50. The meaning of 0.50 is that updating is to be performed when the variation exceeds 50% with respect to the limit of variation.

Figures 11, 12:
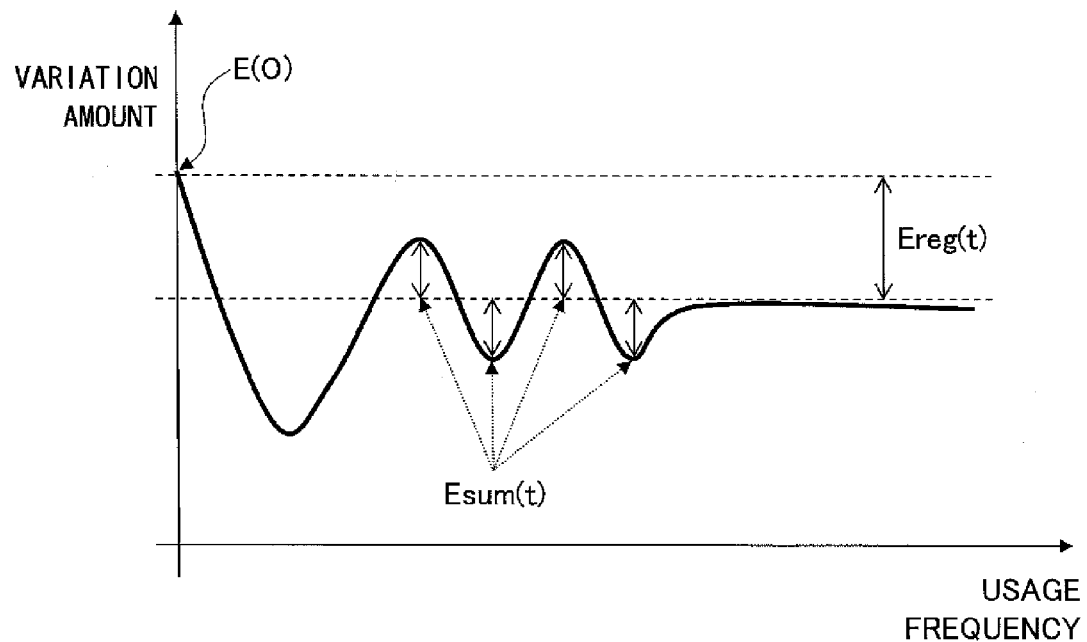
FIG. 11 is for describing Esum(t) and Ereg(t).
FIG. 12 indicates an example of history information of updated dates.

FIG. 11 is for describing Esum(t) and Ereg(t). In the example of FIG. 11, N is 4. As indicated in FIG. 11, as the Esum(t) decreases, the posture becomes steadier. Furthermore, as the Ereg(t) increases, the posture at the time of registration and the posture in a steady state become different.

When the condition 1 and the condition 2 are satisfied, the update determination unit 411 determines to update the registered biological body information. The update determination unit 411 may determine to update the registered biological body information when only condition 1 is satisfied, regardless of condition 2. When it is determined to update the registered biological body information, the update determination unit 411 instructs an update informing unit 413 to report an updating message.

When a report is received from the update determination unit 411, the update informing unit 413 reports, to the user and the system administrator, a message prompting to update (reregister) the registered biological body information. For example, the update informing unit 413 displays the message on the display unit 70 for the user and reports the message to the system administrator by e-mail. The update informing unit 413 stores the e-mail address of the administrator in advance.

When the system administrator is to be present at the time of updating the registered biological body information, the update informing unit 413 may display the time and place that updating is possible in the message to the user. In this case, for example, the registration database 51 stores the time and place that the system administrator is able to be present.

For example, an update processing unit 415 updates the registered biological body information when the system administrator inputs information to be used for updating the registered biological body information. The update processing unit 415 overwrites the registered biological body information registered in the registration database 51 with the biological body information extracted by the feature extracting unit 301, when updating is allowed.

Furthermore, the update processing unit 415 may detect the posture information at the time of updating, determine whether the posture information at the time of updating is the same as the posture information when the posture is steady, and allow the updating only when the posture information at the time of updating is substantially the same as the posture information when the posture is steady. Specifically, the update processing unit 415 obtains the difference between the posture information at the time of updating and the posture information when the posture is steady, and allows the updating when the obtained difference is less than or equal to a predetermined threshold. Accordingly, the biological body information is extracted from an image obtained by photographing the biological body when the posture is steady, and the extracted biological body information may be used as the registered biological body information.

When the registered biological body information is updated, the update processing unit 415 stores the date of updating in the registration database 51. FIG. 12 indicates an example of history information of updated dates. The history information of updated dates is stored for each user.

By storing the updated dates, the update determination unit 411 may determine not to perform the updating when a predetermined period has not passed since the previous updating. Accordingly, the user is prevented from having to frequently perform the update process.

Referring back to FIG. 7, the registration database 51 saves various information items to be used by the biometric authentication device 2. For example, the registration database 51 holds the registered biological body information used for performing biometric authentication on users. Furthermore, the registration database 51 saves "history information of posture information" used by the update determination unit 411 for determining whether to perform updating (see FIG. 10). Furthermore, the registration database 51 saves updating history information of the registered biological body information (see FIG. 12).

As described above, the biometric authentication device 2 may prompt an update process after the posture of the biological body used for biometric authentication has become steady.

<Operation>

Figure 13:
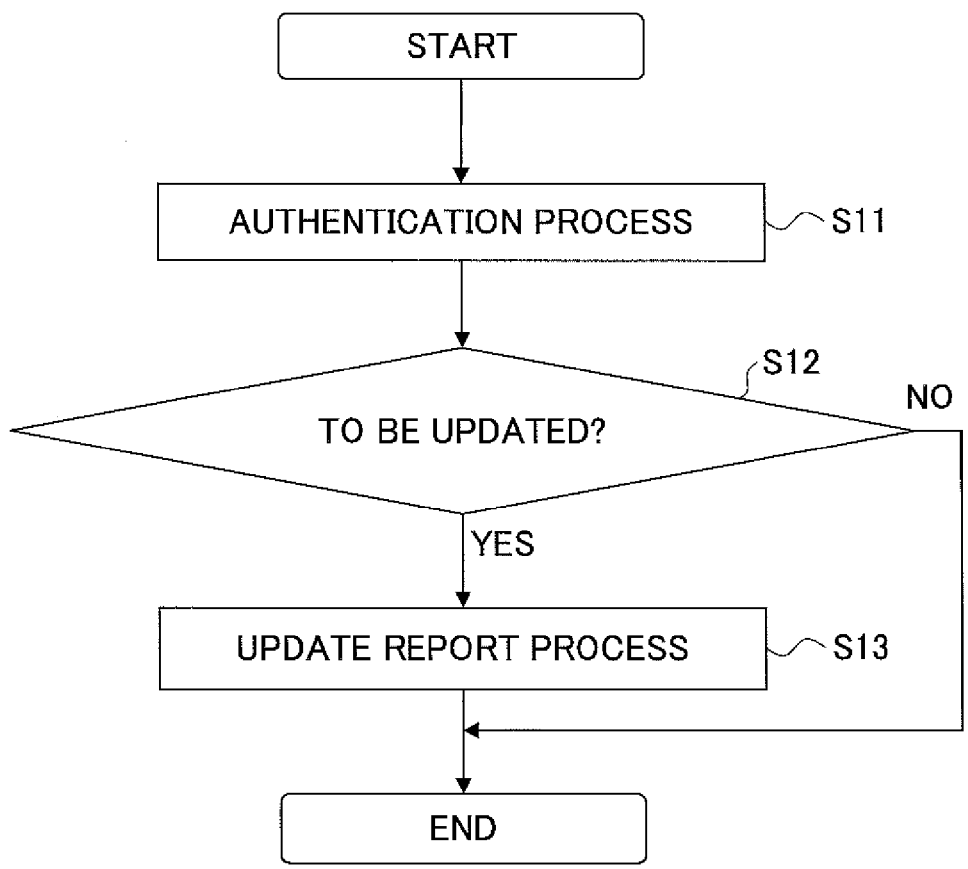
FIG. 13 is a flowchart of an example of an authentication process and an update determination process according to the second embodiment.

Next, a description is given of the operation of the biometric authentication device 2. FIG. 13 is a flowchart of an example of an authentication process and an update determination process according to the second embodiment. In step S11, the authentication processing unit 30 performs the authentication process. The authentication processing unit 30 first acquires the ID input by the user with the input unit 60. Next, the authentication processing unit 30 acquires, from the sensor unit 11, the image obtained by photographing the subject, and extracts the biological body information that is the feature part. Next, the authentication processing unit 30 acquires the registered biological body information corresponding to the ID, and matches the acquired registered biological body information with the extracted biological body information to calculate the similarity degree. The authentication processing unit 30 determines that the person being authenticated is the registered person when the calculated similarity degree is greater than or equal to a predetermined threshold.

In step S12, the update unit 41 determines whether to update the registered biological body information. The update unit 41 determines whether to perform the updating based on the posture information of the biological body. In step S12, when the determination result is YES (update), the process proceeds to step S13, and when the determination result is NO (do not update), the process ends.

In step S13, the update unit 41 outputs a message indicating that the registered biological body information is to be updated to the user and/or the system administrator.

Figure 14:
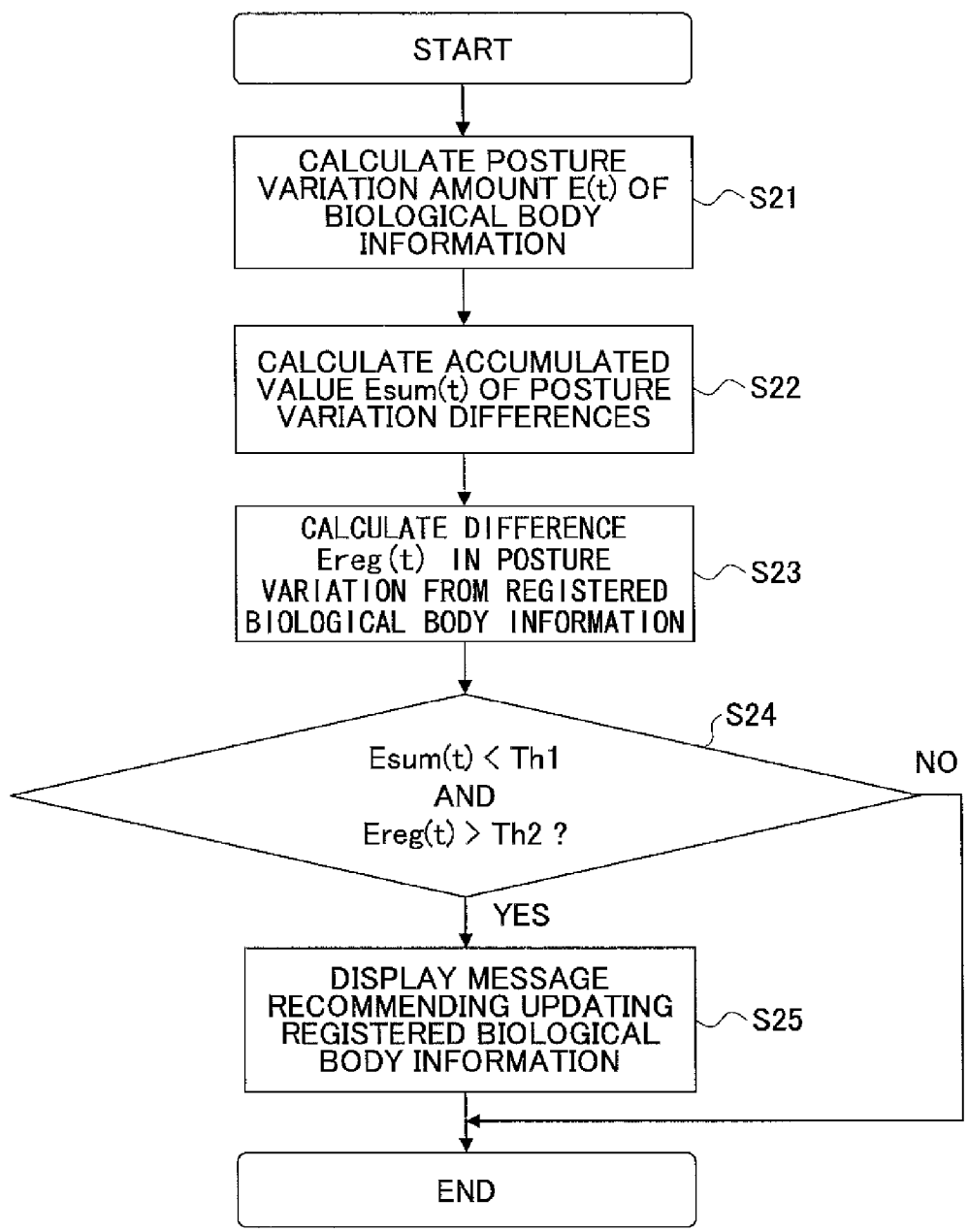
FIG. 14 is a flowchart of an example of detailed processes of an update determination process according to the second embodiment.

Next, a description is given of detailed processes performed at steps S12 and S13 indicated in FIG. 13. FIG. 14 is a flowchart of an example of detailed processes of an update determination process according to the second embodiment. In step S21, the posture determination unit 409 calculates the posture variation amount E(t) indicated by formula (2).

In step S22, the posture determination unit 409 calculates the accumulated value Esum(t) of the posture variation differences indicated by formula (3).

In step S23, the update determination unit 411 calculates the difference Ereg(t) in the posture variation from the time of registration indicated by formula (4).

In step S24, the update determination unit 411 determines whether condition 1 and condition 2 are satisfied. In step S24, when the determination result is YES (both conditions are satisfied), the process proceeds to step S25, and when the determination result is NO (at least one condition is not satisfied), the process ends.

In step S25, the update informing unit 413 outputs a message recommending updating the registered biological body information.

As described above, according to the second embodiment, the steadiness of the posture is determined, and the user is prompted to update the registered biological body information when the posture is steady. Therefore, the update process is performed at an appropriate timing. Furthermore, when the update process is performed at an appropriate timing, the precision of the authentication process performed thereafter is improved.

The process of updating the registered biological body information is typically a burden on the user, and is thus not preferable. That is to say, there may be cases where it is a psychological burden on the user when the user receives a recommendation to update the registered biological body information without advance notice. Therefore, when registering a new user, the biometric authentication device 2 may calculate the predicted time until reregistration from the update history of other users, using the update history of registered biological body information in the registration database 51. Accordingly, it is reported in advance to the user that the registered biological body information may be updated, so that the burden on the user is reduced.

FIG. 15 indicates an example of an update notification screen. The example indicated in FIG. 15 displays the average time until updating of other users, which is approximately one month.

The second embodiment is described by using palm vein authentication as an example; however, in the case of performing finger pattern authentication, distances and tilt angles are not used as the posture information. Furthermore, in the second embodiment, the history of the similarity degree is not stored in the registration database 51, and therefore the biometric authentication device 2 is resistant to attacks using the network (for example, hill-climbing attacks).

[Third Embodiment]

Next, a description is given of a biometric authentication device 3 according to a third embodiment. In the third embodiment, the external environment, such as outside light intensity, is evaluated, so that the update process is performed under favorable outside light conditions when updating the registered biological body information.

<Functional Configuration>

Figure 16:
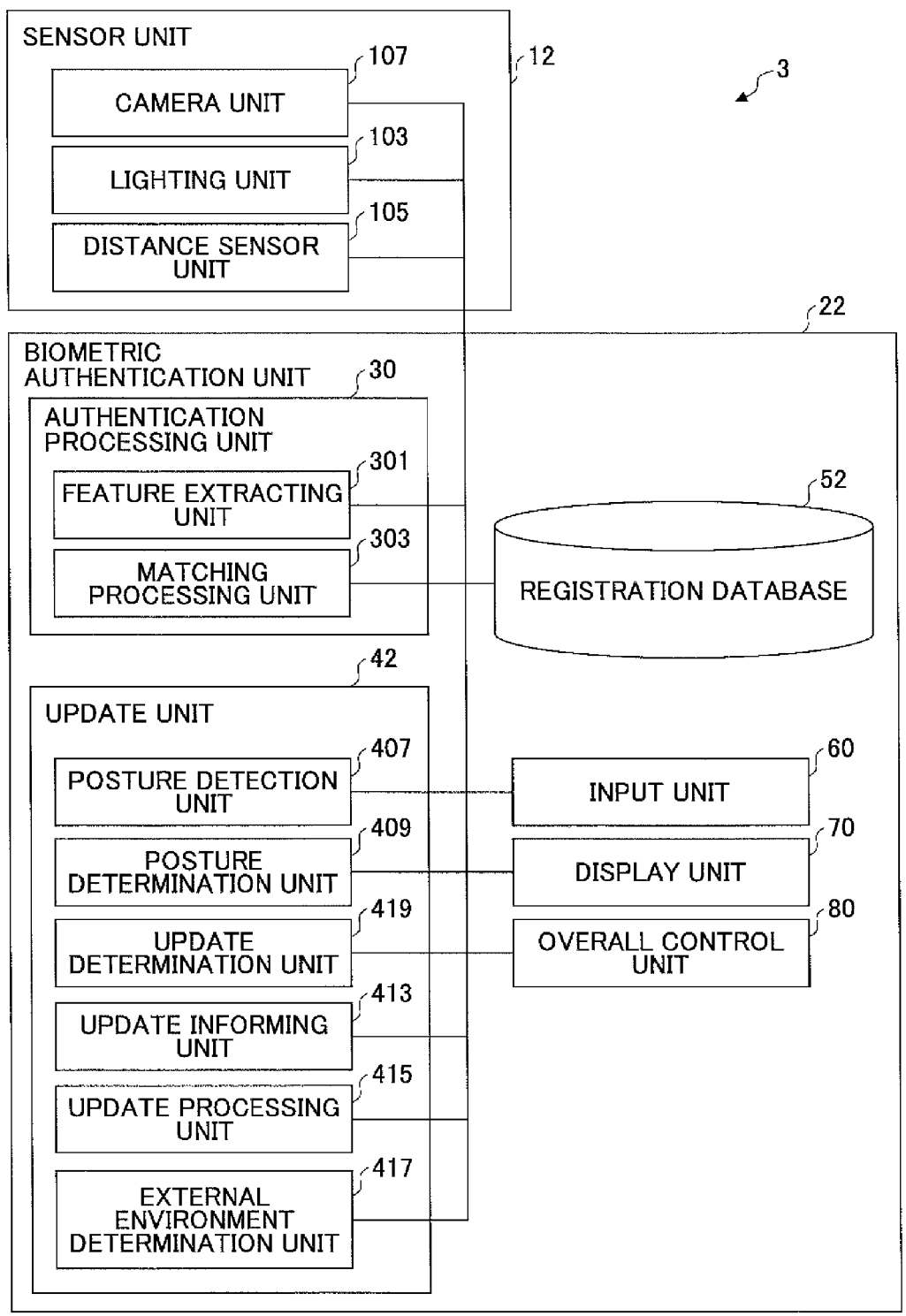
FIG. 16 is a block diagram indicating an example of the functional configuration of a biometric authentication device 3 according to a third embodiment.

FIG. 16 is a block diagram indicating an example of the functional configuration of the biometric authentication device 3 according to the third embodiment. In FIG. 16, the functions corresponding to those in FIG. 7 are denoted by the same reference numerals and are not further described.

A sensor unit 12 includes a camera unit 107, the lighting unit 103, and the distance sensor unit 105. In addition to the functions in the second embodiment, the camera unit 107 periodically photographs the subject when the lighting is turned OFF by the lighting unit 103, and the photographed images are sent to an external environment determination unit 417.

A biometric authentication unit 22 includes the authentication processing unit 30, an update unit 42, a registration database 52, the input unit 60, the display unit 70, and the overall control unit 80. In the following, a description is given of the update unit 42 and the registration database 52. The update unit 42 includes the posture detection unit 407, the posture determination unit 409, an update determination unit 419, the update informing unit 413, the update processing unit 415, and the external environment determination unit 417.

The external environment determination unit 417 acquires, from the sensor unit 12, images when the lighting is turned OFF (hereinafter, also referred to as "lighting OFF images"), and determines whether the external environment is appropriate for performing the update process. Specifically, the external environment determination unit 417 determines the outside light intensity based on the brightness of the pixels in the lighting OFF image. In this example, the outside light means light other than the lighting provided by the lighting unit 103. For example, the outside light may be sunlight or reflection light reflected from a window.

The external environment determination unit 417 searches the pixels of the lighting OFF image acquired from the sensor unit 12, and counts the number of pixels having a brightness that is greater than or equal to a predetermined value. For example, assuming that the range of the brightness of the camera is 0 through 255, the predetermined value is set to be 240.

Furthermore, the external environment determination unit 417 defines that the outside light intensity is the ratio of the counted value with respect to all pixels in the lighting OFF image. When the outside light intensity is greater than or equal to a predetermined value (for example, 5%), the external environment determination unit 417 determines that the external environment is inappropriate for performing an update process. Furthermore, when the outside light intensity is less than the predetermined value, the external environment determination unit 417 determines that the external environment is appropriate for performing an update process.

The external environment determination unit 417 may obtain the outside light intensity in a simplified manner by skipping pixels, instead of obtaining the outside light intensity using all pixels. Accordingly, even if foreign matter, which is not normally photographed, is included in the lighting OFF image, the impact of the foreign matter is reduced.

Next, the external environment determination unit 417 stores the determination results in the registration database 52. Every time a lighting OFF image is acquired, the external environment determination unit 417 calculates the outside light intensity and determines the external environment, and updates the determination result stored in the registration database 52. Accordingly, the registration database 52 holds the latest determination results relevant to the external environment.

The update determination unit 419 adds the determination results relevant to the external environment as the update process determination conditions, in addition to condition 1 and condition 2 of the second embodiment. Specifically, the update determination unit 419 acquires the determination results relevant to the external environment from the registration database 52, and determines to update the registered biological body information when the determination results relevant to the external environment are appropriate for the update process and when condition 1 and condition 2 are satisfied. Subsequent processes are the same as the second embodiment and are thus not further described.

<Operation>

Figure 17:
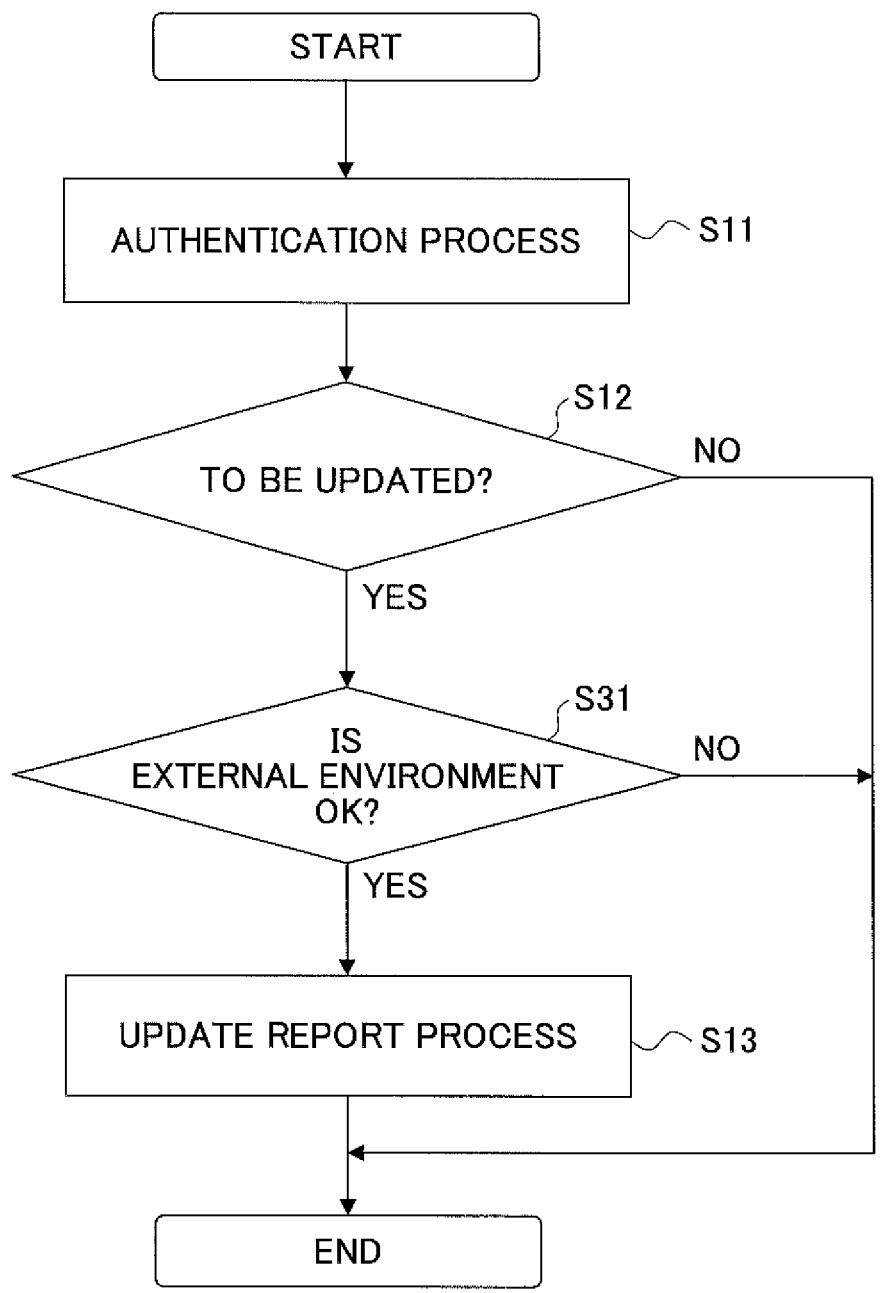
FIG. 17 is a flowchart of an example of an update determination process according to the third embodiment.

FIG. 17 is a flowchart of an example of an update determination process according to the third embodiment. In the process of FIG. 17, the processes corresponding to those of FIG. 13 are denoted by the same step numbers and are not further described.

In step S31, the update determination unit 419 acquires the determination results relevant to the external environment from the registration database 52, and determines whether the external environment is appropriate for the update process. When the determination result at step S31 is YES (external environment OK), the process proceeds to step S13, and the update report process is performed. Meanwhile, when the determination result at step S31 is NO (external environment NG), the process ends.

When the update process is actually performed after the update report process is performed, there may be a time lag. At this time, when the update process is actually performed, the update processing unit 415 may acquire the determination results of the latest external environment from the registration database 52 to determine that the update process is not to be performed if the outside light intensity is too high.

As described above, according to the third embodiment, by evaluating the external environment such as the outside light intensity, when updating the registered biological body information, the update process is performed under preferable outside light conditions.

[Modification]

Figure 18:
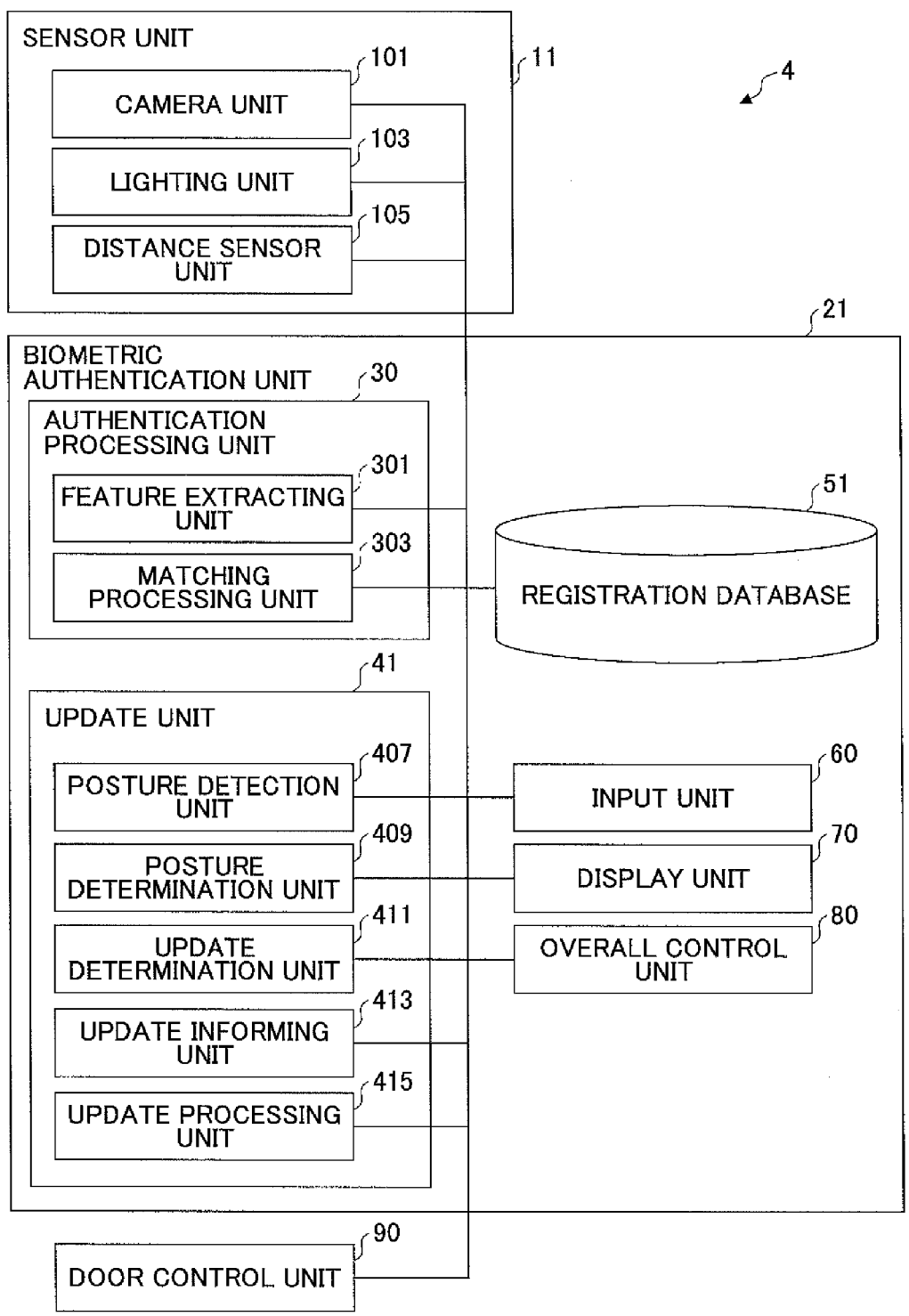
FIG. 18 is a block diagram indicating an example of the functional configuration of a system for controlling a door by biometric authentication.

Next, a description is given of a modification of the biometric authentication devices according to the embodiments described above. FIG. 18 is a block diagram indicating an example of the functional configuration of a system for controlling a door by biometric authentication. As illustrated in FIG. 18, a door control unit 90 is connected to the biometric authentication device 2 according to the second embodiment. The door control unit 90 controls the operation of opening and closing a door according to authentication results of the biometric authentication unit 21. Accordingly, the operation of opening and closing the door is controlled with high security.

Furthermore, FIG. 18 is described by using the biometric authentication device 2. However, the biometric authentication devices according to the other embodiments may be used for controlling the door. Furthermore, the biometric authentication devices according to the respective embodiments are not only applicable to controlling doors, but are also applicable to other systems for intensifying security.

Furthermore, as another modification, a biometric authentication system may be configured such that the biometric authentication units of the respective embodiments are provided in an information processing server connected to a network, and an input unit and a display unit are provided in the sensor unit. In this case, the information processing server having a biometric authentication function may receive the photographed image from the sensor unit via the network, perform an authentication process, and then display the authentication result on the display unit of the sensor unit.

Furthermore, when plural sets of registered biological body information are stored in the registration database, the update processing units of the respective embodiments may overwrite the registered biological body information having the largest difference (Ereg(t)) in posture information with respect to the biological body information that is the update target.

Furthermore, other than overwriting the registered biological body information, the update processing units of the respective embodiments may obtain an average image of the present registered biological body information and the biological body information that is the update target, and use the obtained average image as the new registered biological body information. Accordingly, although the extent of improving variations in the posture is slightly reduced, it is possible to prevent rapid variations in the authentication precision. Furthermore, the above-described predetermined values and thresholds may be set to be appropriate values obtained by conducting experiments.

Furthermore, the biometric authentication device, the biometric authentication system, and the biometric authentication method described in the above embodiments and modifications may be implemented as a program to be executed by a computer. The program may be installed from a server and executed by a computer to implement the biometric authentication process described above.

Furthermore, the program may be recorded in a recording medium (a CD-ROM, an SD card, etc.), and the recording medium recording the program may be read by a computer or a mobile terminal to implement the above-described biometric authentication process. Various types of recording media may be used, such as a recording medium for optically, electrically, or magnetically recording information including a CD-ROM, a flexible disk, and a magnetic optical disk, and a semiconductor memory for electrically recording information including a ROM and a flash memory.

The present invention is not limited to the specific embodiments described herein, and variations and modifications may be made without departing from the scope of the present invention.

According to the disclosed biometric authentication device, the steadiness of the posture is determined, and the user is prompted to update the registered biological body information when the posture is steady, and therefore the update process is performed at an appropriate timing.

All examples and conditional language recited herein are intended for pedagogical purposes to aid the reader in understanding the invention and the concepts contributed by the inventors to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

The invention claimed is:

1. A biometric authentication device comprising:
a camera configured to photograph a biological body and acquire biological body information;
a plurality of distance sensors each of which detects a distance to the biological body; and
a processor configured to execute a process, the process including
matching registered biological body information that is registered in advance with said biological body information and performing authentication;
detecting posture information including at least a tilt angle of the biological body from a reference plane set in advance and a rotational angle of the biological body from a reference position set in advance according to the distances detected by the plurality of distance sensors;
determining an accumulation value of difference values between a predetermined number of sets of said posture information at the time of the authentication and reference information, and determining that the posture of said biological body is steady when the accumulation value is less than or equal to a first predetermined value;
updating said registered biological body information with the biological body information at the time of the authentication when the posture of said biological body is steady and a difference value between said posture information at the time of registration and said posture information at the time of the authentication is greater than or equal to a second predetermined value; and
determining an outside light intensity indicating an intensity of an outside light, based on brightness values of pixels in an image photographed when lighting is off by said camera,
wherein the processor determines to update said registered biological body information when further determining that said outside light intensity is normal, and
wherein the processor sets, as said outside light intensity, a ratio of pixels having said brightness values that are greater than or equal to a fourth predetermined value with respect to all pixels in said image, and determines that said outside light intensity is normal when said outside light intensity is within a third predetermined value.

2. The biometric authentication device according to claim 1, wherein the process further includes
updating said registered biological body information when determining to update said registered biological body information.

3. The biometric authentication device according to claim 2, wherein
the processor updates said registered biological body information by using biological body information that is an update target, when a difference value between said posture information in the biological body information that is the update target and said posture information at the time when the posture is steady is less than or equal to a fifth predetermined value.

4. The biometric authentication device according to claim 1, wherein
said posture information further includes at least one of a distance between said biological body and the reference plane set in advance and a position of said biological body with respect to the reference position set in advance.

5. The biometric authentication device according to claim 1, wherein
said posture information is a similarity degree between said registered biological body information and said biological body information.

6. A biometric authentication system comprising:
a camera configured to photograph a biological body and acquire biological body information;
a plurality of distance sensors each of which detects a distance to the biological body; and
a processor configured to execute a process, the process including
matching registered biological body information that is registered in advance with said biological body information and performing authentication;
detecting posture information including at least a tilt angle of the biological body from a reference plane set in advance and a rotational angle of the biological body from a reference position set in advance according to the distances detected by the plurality of distance sensors;
determining an accumulation value of difference values between a predetermined number of sets of said posture information at the time of the authentication and reference information, and determining that the posture of said biological body is steady when the accumulation value is less than or equal to a first predetermined value;
updating said registered biological body information with the biological body information at the time of the authentication when the posture of said biological body is steady and a difference value between said posture information at the time of registration and said posture information at the time of the authentication is greater than or equal to a second predetermined value; and
determining an outside light intensity indicating an intensity of an outside light, based on brightness values of pixels in an image photographed when lighting is off by said camera,
wherein the processor determines to update said registered biological body information when further determining that said outside light intensity is normal, and
wherein the processor sets, as said outside light intensity, a ratio of pixels having said brightness values that are greater than or equal to a fourth predetermined value with respect to all pixels in said image, and determines that said outside light intensity is normal when said outside light intensity is within a third predetermined value.

7. A biometric authentication method comprising:
photographing a biological body and acquiring biological body information;

matching registered biological body information that is registered in advance with said biological body information and performing authentication;
detecting a distance to the biological body by each of a plurality of distance sensors;
detecting posture information including at least a tilt angle of the biological body from a reference plane set in advance and a rotational angle of the biological body from a reference position set in advance according to the distances detected by the plurality of distance sensors;
determining an accumulation value of difference values between a predetermined number of sets of said posture information at the time of the authentication and reference information, and determining that the posture of said biological body is steady when the accumulation value is less than or equal to a first predetermined value;
updating said registered biological body information with the biological body information at the time of the authentication when the posture of said biological body is determined as being steady and a difference value between said posture information at the time of registration and said posture information at the time of the authentication is determined as being greater than or equal to a second predetermined value;
determining an outside light intensity indicating an intensity of an outside light, based on brightness values of pixels in an image photographed when lighting is off during said photographing;
updating said registered biological body information when further determining that said outside light intensity is normal;
setting a ratio of pixels having said brightness values that are greater than or equal to a fourth predetermined value with respect to all pixels in said image as said outside light intensity; and
determining that said outside light intensity is normal when said outside light intensity is within a third predetermined value.

* * * * *